United States Patent [19]
Farina et al.

[11] Patent Number: 5,193,128
[45] Date of Patent: Mar. 9, 1993

[54] INTEGRATED OPTIC MODULATOR WITH SMOOTH ELECTRO-OPTIC BANDPASS CHARACTERISTICS

[75] Inventors: James D. Farina, Tolland; Paul G. Suchoski, East Hartford, both of Conn.

[73] Assignee: United Technologies Corporation, Hartford, Conn.

[21] Appl. No.: 813,468

[22] Filed: Dec. 26, 1991

[51] Int. Cl.[5] .............................................. G02B 6/10
[52] U.S. Cl. ............................................ 385/3; 385/2
[58] Field of Search .................................... 385/2, 3, 4

[56] References Cited

U.S. PATENT DOCUMENTS 4,684,207 8/1987 Lawless .................................... 385/2
4,984,861 1/1991 Suchoski, Jr. et al. ................. 385/2

Primary Examiner—John D. Lee
Assistant Examiner—Phan T. Heartney
Attorney, Agent, or Firm—Peter R. Ruzek

[57] ABSTRACT

An optic intensity modulator includes a substrate of an optic material that is conductive to light and acoustic waves and has both electrooptic and piezoelectric properties. A pair of associated elongated light waveguides is formed in the substrate, with the waveguides extending substantially coextensively with one another, and being separated from one another by a transverse distance that gradually varies along the courses of the waveguides. Each of two portions of light of substantially identical properties is launched into one of the waveguides for propagation longitudinally thereof, and different phase shifts are induced in the light portions as they propagate in the waveguides by imposing different variable electric fields onto each of the waveguides. The light portions are combined with one another subsequently to their emergence from the waveguides with attendant amplitude modulation of the combined output light due to interference between such phase-shifted light portions.

7 Claims, 3 Drawing Sheets

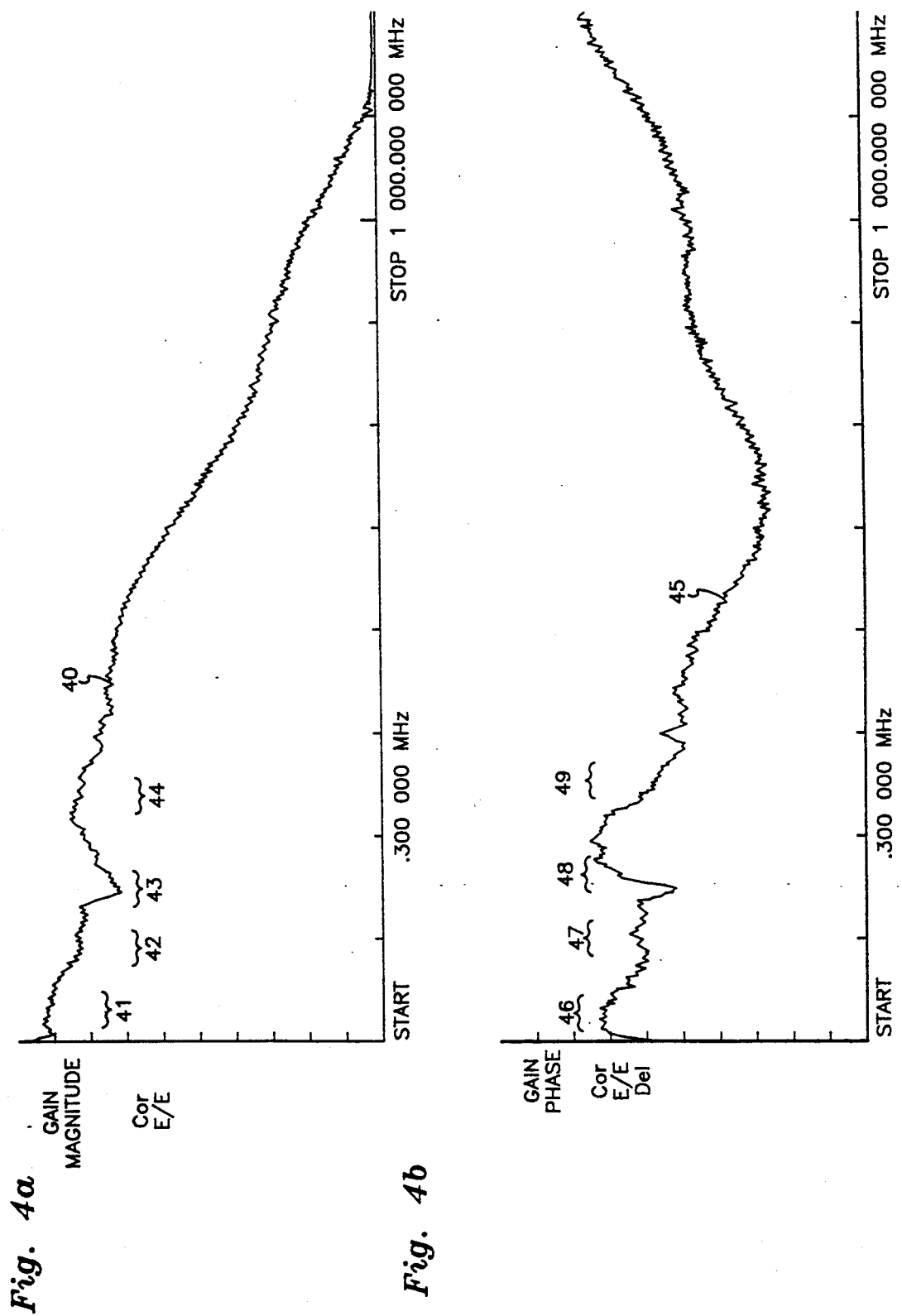

INTEGRATED OPTIC MODULATOR WITH SMOOTH ELECTRO-OPTIC BANDPASS CHARACTERISTICS

DESCRIPTION

1. Technical Field

The present invention relates to optic modulators in general, and more particularly to integrated optic modulators using light interference to achieve light intensity modulation in response to electrical input signal value changes.

2. Background Art

There are already known various constructions of optic modulators, among them those which utilize interference between coherent light beams or portions originating at the same light source but selectively phase-shifted relative to one another, prior to being combined, in such a manner as to impose the desired intensity modulation onto the combined light beam.

In this context, it is to be mentioned that integrated optic intensity modulators that employ optical materials exhibiting the electrooptic effect, especially lithium niobate or lithium tantalate, offer many advantages and, consequently, are becoming increasingly important and popular in high-performance analog fiber optic links.

In a representative integrated optic intensity modulator of this kind, input light is split into two portions each of which is launched into one of two parallel waveguides, which are formed in respective regions of a substrate of the above optical material exhibiting the electrooptic effect, for guided propagation in such waveguides. Then, a different phase shift is induced in each of such the light portions during its propagation in the associated waveguide by applying a different electric potential difference or field, typically of the same magnitude but of the opposite sense, across each of the waveguides, using respective electrodes extending parallel to one another along such waveguides. The light portions emerging from the waveguides are then combined, with the result that interference effects result in modulation of the intensity of the combined light in dependence on the phase difference between the light portions arriving from the two waveguides. By varying the difference between the applied electric fields, the intensity of the combined light can be selectively varied from its peak achieved when the light portions are in phase, due to constructive interference, to its low, ideally zero, occurring when the light portions are 180° out of phase with attendant substantially complete destructive interference.

A particular advantage of integrated optic modulators of this kind, aside from incurring only minuscule or negligible optical losses, is that they can be compact in size, thus minimizing not only the amount of space occupied by them but also the amount of electric power consumed in the process of imposing the optical modulation. Applications for such modulators include but are not limited to cable television, antenna remoting, and phased array radar.

Yet, experience with optic modulators constructed in the manner described above has shown that the quality of the combined light, unfortunately, is not as high as desired at least for certain of the aforementioned applications, in that both the gain and the phase characteristics of the imposed modulation exhibit a not insubstantial amount of ripple or fine structure. This, in turn, inhibits the use of such modulators for some demanding applications.

It was recognized that one of the causes, if not the cause, of the presence of such ripple or fine structure in the frequency response is the influence of acoustic waves on the light portions propagating in the two parallel waveguides. In this respect, it is to be mentioned that the optical materials constituting the waveguides and the remainder of the substrate and/or the electrodes are capable of not only conducting but also producing acoustic waves, including those which are generated as a result of the application of the different electric fields to the parallel waveguides and the attendant piezoelectric effect. The acoustic waves generated at the region of one of the waveguides not only influence the light portion propagating in that waveguide, but also travel across the spacing between the waveguides and disturb at least the phase of the light propagating in the respective other waveguide, thus ultimately affecting, in a deleterious manner, the interference of the light issuing from the two waveguides and thus the ability of the modulator device to modulate the outgoing light in the desired manner.

While the usually adopted proximate arrangement of the two parallel waveguides, which is dictated by the quest for compactness, has much to do with the magnitude of the acoustically caused disturbances in the two branches, mere increase in the spacing between the parallel waveguides within realistic limits would not solve the acoustic problem; rather, it would simply change the frequencies at which the effect is most pronounced. Moreover, other ways of dealing with this acoustic noise or interaction problem, such as the application of a compliant material, such as RTV, to the top surface of the substrate (waveguide surface), and/or the grinding or grooving of the back surface of the substrate, in a manner designed to absorb and scatter the acoustic energy, have met with only a limited degree of success in that they have resulted merely in reduction, but not in substantial elimination, of the acoustic interaction throughout the frequency range of interest, so that the amount of noise present in the combined optical signal as a result of use of this modulation technique with attendant acoustic action and interaction is still considerable.

Accordingly, it is a general object of the present invention to avoid the disadvantages of the prior art.

More particularly, it is an object of the present invention to provide an integrated electrooptic modulator utilizing light interference, which modulator does not possess the disadvantages of the known modulators of this kind.

Still another object of the present invention is so to develop the modulator of the type here under consideration as to reduce if not eliminate the amplitude and phase distortion of the modulated optical signal that is attributable to acoustic action and interaction.

It is yet another object of the present invention to devise a modulator of the above type which produces a very flat frequency response in the modulated optical signal throughout the optical frequency band of interest.

A concomitant object of the present invention is design the modulator of the above type in such a manner as to be relatively simple in construction, inexpensive to manufacture, easy to use, and yet reliable in operation.

DISCLOSURE OF THE INVENTION

In keeping with these objects and others which will become apparent hereafter, one feature of the present invention resides in an optic intensity modulator which includes a substrate of an optic material that is conductive to light and acoustic waves and has both electrooptic and piezoelectric properties. A pair of associated elongated light waveguides is formed in the substrate. According to the present invention, the waveguides extend substantially coextensively with one another and are separated from one another by a transverse distance that gradually varies along the courses of the waveguides. The modulator further includes means for launching two portions of light of substantially identical properties each into one of the waveguides for propagation longitudinally thereof and means for inducing different phase shifts in the light portions as they propagate in the waveguides, including means for imposing different variable electric fields onto each of the waveguides. There is further provided means for combining the light portions with one another after the emergence thereof from the waveguides with attendant amplitude modulation of the combined output light due to interference between such phase-shifted light portions.

A particular advantage of the modulator according to the present invention as described so far is that, because of the varying spacing between the waveguides along their courses, the tendency of the acoustic waves that are generated during the operation of the modulator due to the piezoelectric effect to resonate between the waveguides at certain frequencies, which resonance is encountered and has particularly pronounced and asymmetrical effects on the properties of the light of the two light portions when the two waveguides are parallel to one another, is eliminated or at least spread to affect various light frequencies within the frequency range of interest in a much more uniform manner, thus reducing if not eliminating that noise distortion of the combined optical output signal that is attributable to the effect of the acoustic waves generated during the operation of the modulator.

BRIEF DESCRIPTION OF THE DRAWING

The present invention will be described in more detail below with reference to the accompanying drawing in which:

FIGS. 4a and 4b are graphic representations corresponding those of FIGS. 3a and 4a but obtained from the modified modulator construction that is depicted in FIGS. 1 and 2 to incorporate the present invention.

BEST MODE FOR CARRYING OUT THE INVENTION

Figure 1:
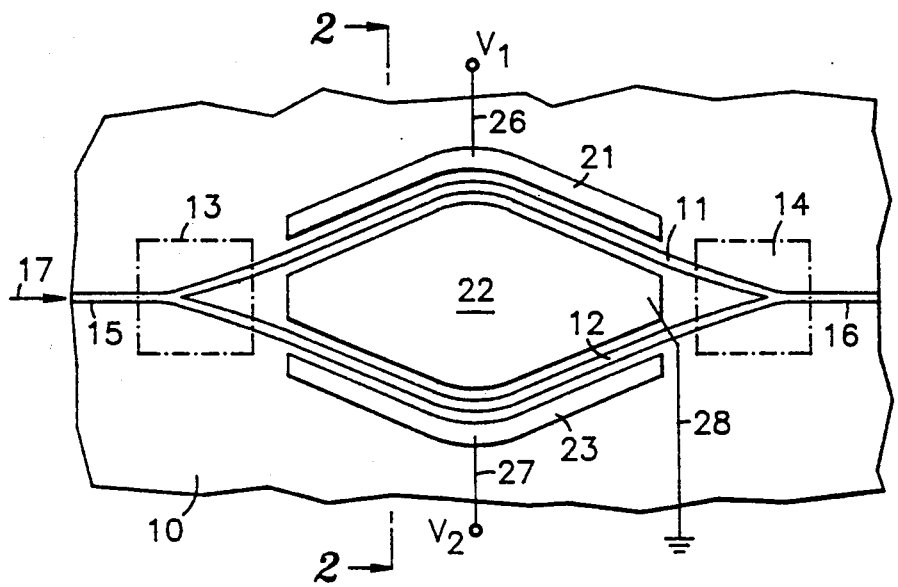
FIG. 1 is a top plan view of a portion of a substrate provided with an exemplary Mach-Zehnder interferometric optical modulator arrangement embodying the present invention.

Referring now to the drawing in detail, and first to FIG. 1 thereof, it may be seen that the reference numeral 10 has been used therein to identify a substrate of an integrated optic modulator embodying the present invention. The substrate 10 is preferably made of lithium niobate (LiNbo3) or lithium tantalate (LiTaO3), and has two optical waveguides 11 and 12 formed therein by any conventional techniques, such as by ion exchange. Moreover, in the illustrated modulator construction, the substrate 10 is also provided with two 3-dB input and output couplers 13 and 14, such as Y-junctions or directional couplers, of which the input coupler 13 is interposed between an incoming waveguiding channel 15 for incoming light 17 and respective input ends of the waveguides 11 and 12 and the output coupler 14 is situated between the output ends of the waveguides 11 and 12 and an outgoing waveguiding channel 15 for outgoing light 18.

Figure 2:
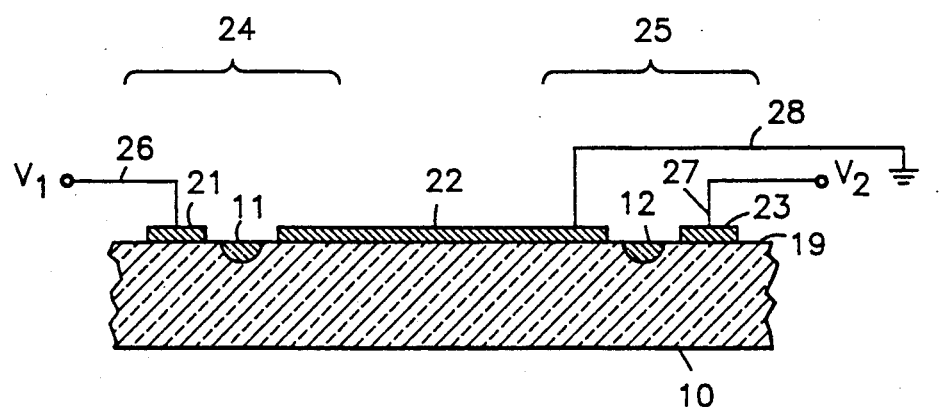
FIG. 2 is a cross-sectional view of the arrangement of FIG. 1, taken on line 2—2 of FIG. 1.

As a comparison with FIG. 2 of the drawing will reveal, the waveguides 11 and 12 are formed at one and the same major surface 19 of the substrate 10 which also carries respective electrodes 21, 22 and 23. The electrodes 21 and 22, on the one hand, and 22 and 23, on the other hand, are arranged in or constitute respective electrode pairs 24 and 25, each straddling an associated one of the waveguides 11 and 12. In the illustrated modulator construction, electric leads 26 and 27 are connected to the electrodes 21 and 23, respectively, and are being used during the operation of the optic modulator to apply thereto respective variable electric potentials or voltages $V_1$ and $V_2$, while the electrode 22 is permanently grounded via an electric lead 28. It will be appreciated that at least the lithium niobate, lithium tantalate or similar optical material constituting the waveguides 11 and 12 exhibits, as is well known, electrooptic properties so that the application of respective electric fields resulting from the electric potential differences between $V_1$ and ground, and $V_2$ and ground, respectively, across the waveguides 11 and 12 results in phase shifts in the light portions propagating in the respective waveguides 11 and 12. The voltages $V_1$ and $V_2$ may have the same absolute value but the electric fields resulting from their application cause phase shifts of opposite senses in the two light portions.

It may be seen from the above description that the optical modulator of the present invention generally consists of a Mach-Zehnder interferometer and two phase modulators that include the electrode pairs 24 and 25, respectively. The phase modulators are arranged electrically in parallel and are operated in a push-pull manner. During operation, optical power in the single mode input waveguide 15 is divided equally at the first 3-dB coupler 13, and the relative phase of the two light portions propagating in the two interferometer arms or waveguides 11 and 12 can be adjusted through the linear electrooptic effect by varying the aforementioned potential differences effective at the electrode pairs 24 and 25 in such a manner that the signals arriving at the output 3-dB coupler 14 are anywhere from in phase to 180° out of phase. When $V_1 = V_2 = V$, then the optical power in the output waveguide 18 is determined by the standard interferometer response of $P_{out} = \frac{1}{2}[P_{in}(1 + \cos kV)]$ wherein k is a constant of a known value. In analog applications, the modulator is usually biased at the half-power point where it exhibits a linear response for small signal modulation.

Modulator devices for lower frequency applications (DC to 1.5 GHz) are typically realized using lumped-element electrodes. The frequency response of these devices can be modeled to first-order as a series RLC. In devices of this type, it should be possible, at least in theory, to obtain a very flat gain and phase response in a given frequency band by properly designing the electrodes to achieve the desired resistances and capacitances, and by minimizing the parasitic effects of the package. However, in actuality, the frequency response of previously made $LiNbO_3$ and $LiTaO_3$ integrated optic modulators has been plagued by sharp dips in the gain and phase response.

In searching for the cause of such disturbances, it was discovered that they are attributable to acoustic influences. While it is not surprising that integrated optic modulators fabricated in $LiNbO_3$ and $LiTaO_3$ are susceptible to acoustic interference since these materials are capable of conducting acoustic waves, it was determined that one of the main reasons, if not the reason, for the existence of the acoustic waves in the modulator is that such materials are piezoelectric in addition to being electrooptic. Consequently, the electrode pairs 24 and 25 act as piezoelectric transducers so that application of a voltage to the electrodes 21 and 23 launches into the material bulk and surface acoustic waves which then travel, among others, between the waveguides 11 and 12 and exert their influence on the light portions propagating therein. This acoustic action alone, however, would result only in a relatively insignificant, and probably unavoidable, degradation of the optical signals in the waveguides. It was established that the real culprit in the pronounced optical signal deterioration encountered when the waveguides 11 and 12 are arranged, as is customary, in parallelism with one another, is the interaction encountered at certain resonant frequencies at which the acoustic coupling between the waveguides becomes sufficiently efficient for it to strongly effect the input impedance of the phase modulators. In addition, the launched acoustic waves interact with the optical field via the acoustooptic effect.

While there are some applications for the modulators of the above type in which the presence of the acoustically caused disturbances in the optical signals would be acceptable, there are many other applications that require a very flat frequency response in the frequency band of interest ($\pm 0.5$ dB gain flatness, $\pm 2$ degrees phase flatness). Moreover, other applications would benefit from such performance characteristics.

To this end, there is being proposed here a modification of the basic Mach-Zehnder modulator structure of the type described above. In accordance with the present invention, the geometry of the modulator device, and particularly the spacing between the waveguides 11 and 12, varies along the length of the modulator device. FIG. 1 of the drawing reveals a particular example of this varying geometry. As shown there, the waveguides 11 and 12 follow respective arcuate courses, being at a minimum distance from one another at the regions of their ends and at a maximum distance from each other at the central regions thereof. The illustrated shape of such courses, which is a raised cosine, while particularly advantageous, is not the only one contemplated by the present invention. Rather, the waveguides 11 and 12 may follow differently shaped courses so long as they are not parallel to one another over their entire lengths, or over a significant portion thereof, and so long as it is assured that they can act as optical waveguides without suffering significant light insertion and/or propagation losses. It may also be seen that the electrodes 21, 22 and 23 are shaped to conform to such waveguide courses at least at the regions thereof that adjoin the waveguides 11 and 12, which assures substantially uniform application of the aforementioned electric fields over the entire lengths of the respective waveguides 11 and 12.

It was established that, by varying the center-to-center waveguide spacing along the device, it is possible to destroy the pronounced resonance condition described above and, through the attendant large reduction in the acoustic Q of the structure, spread the acoustic resonance more uniformly over a wider frequency band. As mentioned before, proper waveguide design such as that discussed above results in a modified modulator device geometry with no increase in optical insertion loss.

Figure 3A:
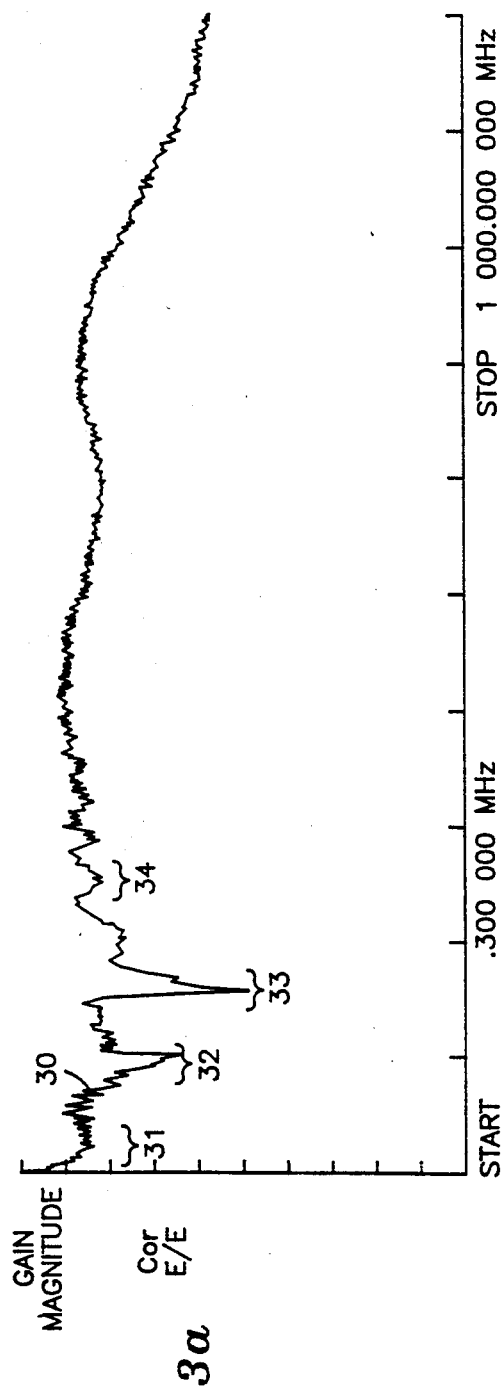
FIGS. 3a and 3b are graphic representations of the gain and phase responses of an unmodified modulator akin to that of FIGS. 1 and 2 but with parallel waveguides at various modulation frequencies.
Figure 3B:
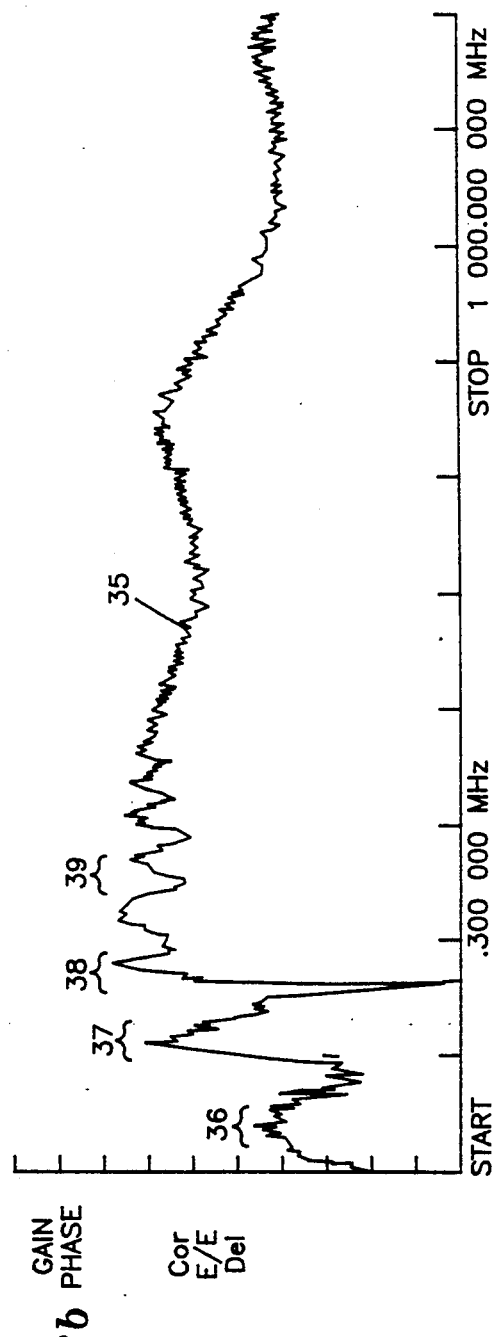

Modified Mach-Zehnder modulators of the above type have recently been fabricated in $LiNbO_3$ using the known APE process, packaged, and tested in comparison with a similar but unmodified modulator in which the waveguides and the electrodes extend in parallelism with one another. The tested unmodified modulator had a waveguide center-to-center spacing of 40 microns, while the center-to-center spacing of the modified modulator went from 35 $\mu$m at the ends to 500 $\mu$m in the center. The results of such tests are presented for comparison of the performances of such unmodified and modified modulator devices, respectively, in FIGS. 3a and 4a representative of the magnitude of, and in FIGS. 3b and 4b representative of the phase shift in, the modulated optical output signal 18. The tests were conducted in each instance in a series of test phases during each of which the voltage V was applied to the respective electrodes (21 and 23 in the modified construction) in the form of an alternating voltage of a given modulation frequency in the radio-frequency (RF) range and the relative magnitude and phase of the modulation contained in the optical output signal 18 with respect to the power and phase of the RF electrical signal supplied to the aforementioned electrodes were detected using conventional detection techniques and equipment. After the conclusion of this test phase, the same process was repeated during subsequent test phases but with the RF modulation frequencies being different from the original one and from each other, until sufficient amount of data was collected covering the entire frequency range of interest. The thus collected data is graphically displayed in the above FIGS. 3a to 4b.

As may be ascertained by observing respective response curves 30 and 35 presented in FIGS. 3a and 3b, which are representative of the gain and phase frequency responses, a characteristic acoustic signature of an unmodified Mach-Zehnder modulator with a given constant center-to-center waveguide spacing (of 40 $\mu$m in the illustrated example) is given by resonant frequency f which is a function of the velocity of the various bulk and surface waves supported by the device geometry and the geometry of the crystal including the waveguide spacing. The curves 30 and 35 have pronounced notches or dips at respective substantially corresponding regions 31 to 34 and 36 to 39. The dips, which coincide with the onset of acoustic resonances in the crystal, are sufficiently large that they can limit the usefulness of the $LiNbO_3$ and $LiTaO_3$ modulators in certain key applications such as CATV signal distribution in the 50 to 400 MHz band. Similar effects are present in traveling-wave modulators which are used for higher-frequency and broader-band applications. It should also be noted that there is a very fine structure in the frequency response of the device, indicating a high Q for the acoustic interactions.

In comparison, corresponding curves 40 and 45 of FIGS. 4a and 4b, which are again representative of gain and phase of frequency responses, but this time for the modified modulator constructed in accordance with the present invention (with a 500 um maximum spacing in the illustrated example), demonstrate that a tremendous reduction has been achieved in the response of these devices to the acoustic influences. More particularly, it may be seen that, at regions 41 to 44 of the curve 40, and regions 46 to 49 of the curve 45 (which correspond to the regions 31 to 34 of the curve 30, and regions 36 to 39 of the curve 35), the acoustic influence has been reduced to such an extent as to be virtually indistinguishable from the "background" noise.

While the present invention has been illustrated and described as embodied in a particular construction of an optic modulator, it will be appreciated that the it is not limited to this particular example; rather, the scope of protection of the present invention is to be determined solely from the attached claims.

We claim:

1. An optic intensity modulator comprising
    a substrate of an optic material that is conductive to light and acoustic waves and has both electrooptic and piezoelectric properties;
    a pair of associated elongated light waveguides formed in said substrate, extending substantially coextensively with one another, and separated from one another by a transverse distance that gradually varies along and over substantially the entire courses of said waveguides;
    means for launching two portions of light of substantially identical properties each into one of said waveguides for propagation longitudinally thereof;
    means for inducing different phase shifts in said light portions as they propagate in said waveguides, including means for imposing different variable electric fields onto each of said waveguides; and
    means for combining said light portions with one another after the emergence thereof from said waveguides with attendant amplitude modulation of the combined output light due to interference between such phase-shifted light portions.

2. The optic modulator as defined in claim 1, wherein said substrate is plate shaped having two major surfaces; wherein both of said waveguides are situated at one of said major surfaces; and wherein said imposing means includes respective pairs of electrodes disposed at said one major surface across an associated one of said waveguides from one another in each of said electrode pairs, and means for supplying electric energy to said electrodes in such a manner as to create between said electrodes of each of said electrode pairs respective electrical potential differences resulting in said different electric fields.

3. The optic modulator as defined in claim 2, wherein one of said electrodes of each of said electrode pairs is situated between said waveguides and is merged with said one electrode of the respective other of said pairs into a unitary electrode; and wherein said supplying means includes means for maintaining said unitary electrode at a predetermined electric potential, and means for varying the electrical potential of the other of said electrodes of each of said electrode pairs.

4. The optic modulator as defined in claim 2, wherein said electrodes of each of said electrode pairs have regions adjoining said associated waveguides and contoured to follow said courses of said associated waveguides.

5. The optic modulator as defined in claim 1, wherein said launching means includes an input optical coupler formed in said substrate upstream of said waveguides as considered in the direction of propagation of incoming light and operative for directing said light portions into said waveguides; and wherein said combining means includes an output optical coupler formed in said substrate downstream of said waveguides as considered in the direction of propagation of said light portions and operative for receiving said light portions and combining the same with one another into said combined output light.

6. The optic modulator as defined in claim 1, wherein said courses of said waveguides have arcuate configurations.

7. The optic modulator as defined in claim 1, wherein said spacing is at its minimum at the region of respective ends of said waveguides and increases from said ends toward a central region of said waveguides.

* * * * *